United States Patent
White

(10) Patent No.: US 7,347,367 B2
(45) Date of Patent: Mar. 25, 2008

(54) SYSTEM AND METHOD OF VERIFYING ITEM PLACEMENT ON A SECURITY SCALE

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 376 days.

(21) Appl. No.: 10/779,283

(22) Filed: Feb. 13, 2004

(65) Prior Publication Data

US 2005/0184147 A1    Aug. 25, 2005

(51) Int. Cl.
*G06K 15/00*    (2006.01)

(52) U.S. Cl. .......................................... 235/383; 186/61

(58) Field of Classification Search ................ 235/383, 235/385; 705/23, 16; 186/59, 61, 64; 177/25.15
See application file for complete search history.

(56) References Cited

U.S. PATENT DOCUMENTS

| | | | |
|---|---|---|---|
| 5,083,638 A * | 1/1992 | Schneider | 186/61 |
| 5,125,465 A * | 6/1992 | Schneider | 177/50 |
| 6,080,938 A * | 6/2000 | Lutz | 177/25.15 |
| 6,145,629 A * | 11/2000 | Addy | 186/61 |
| 6,315,199 B1 | 11/2001 | Ito et al. | |
| 6,488,207 B1 * | 12/2002 | Kawai et al. | 235/383 |
| 6,651,878 B2 * | 11/2003 | Malatesta et al. | 235/375 |
| 6,794,586 B1 * | 9/2004 | Mason | 177/25.15 |
| 2002/0170782 A1 * | 11/2002 | Millikan | 186/61 |
| 2003/0024982 A1 * | 2/2003 | Bellis et al. | 235/383 |
| 2003/0047387 A1 | 3/2003 | Bogat | |
| 2004/0199427 A1 | 10/2004 | Van Der Loo | |
| 2006/0080177 A1 * | 4/2006 | Walter et al. | 705/23 |

FOREIGN PATENT DOCUMENTS

| | | | |
|---|---|---|---|
| EP | 0178223 A | | 4/1986 |
| EP | 0654477 A | | 5/1995 |
| GB | 2161631 A | | 1/1986 |

OTHER PUBLICATIONS

IBM Technical Disclosure Bulletin, IBM Corp., New York, US, "Grocery Buggy", Nov. 1, 1988, vol. 31, No. 6, XP000605028.

* cited by examiner

*Primary Examiner*—Daniel Stcyr
(74) *Attorney, Agent, or Firm*—Paul W. Martin; Harden E. Stevens, III

(57) ABSTRACT

A system and method of verifying item placement on a security scale. The system includes a computer for receiving incremental weight signals from a security weight scale, wherein some of the incremental weight signals are unrelated to placement of items on the security weight scale, and an item detector for detecting movement of the item from a scanner following scanning of the item and for generating an item detection signal, wherein the computer ignores the incremental weight signal unless it receives the item detection signal within a predetermined time period preceding receipt of the incremental weight signal.

11 Claims, 3 Drawing Sheets

SYSTEM AND METHOD OF VERIFYING ITEM PLACEMENT ON A SECURITY SCALE

BACKGROUND OF THE INVENTION

The present invention relates to self-service checkout systems, and specifically to a system and method of verifying item placement on a security scale.

Self-service checkout systems generally include security scales for determining weights of purchased items. The weights are compared to reference weights to determine whether a substitution has occurred.

Wind and other atmospheric disturbances in the vicinity of a self-service checkout system can fool security systems into believing that an item has been placed on a security scale, when in fact no item placement has occurred. Wind can be especially problematic in stores that leave doors open.

Therefore, it would be desirable to provide a system and method which verifies item placement on a security scale before implementing weight-based security procedures.

SUMMARY OF THE INVENTION

In accordance with the present invention, a system and method of verifying item placement on a security scale is provided.

The system includes a computer for receiving incremental weight signals from a security weight scale, wherein some of the incremental weight signals are unrelated to placement of items on the security weight scale, and an item detector for detecting movement of the item from a scanner following scanning of the item and for generating an item detection signal, wherein the computer ignores the incremental weight signal unless it receives the item detection signal within a predetermined time period preceding receipt of the incremental weight signal.

It is accordingly an object of the present invention to provide a system and method of verifying item placement on a security scale.

It is another object of the present invention to avoid security alarms caused by wind and other atmospheric disturbances in the vicinity of security scales.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
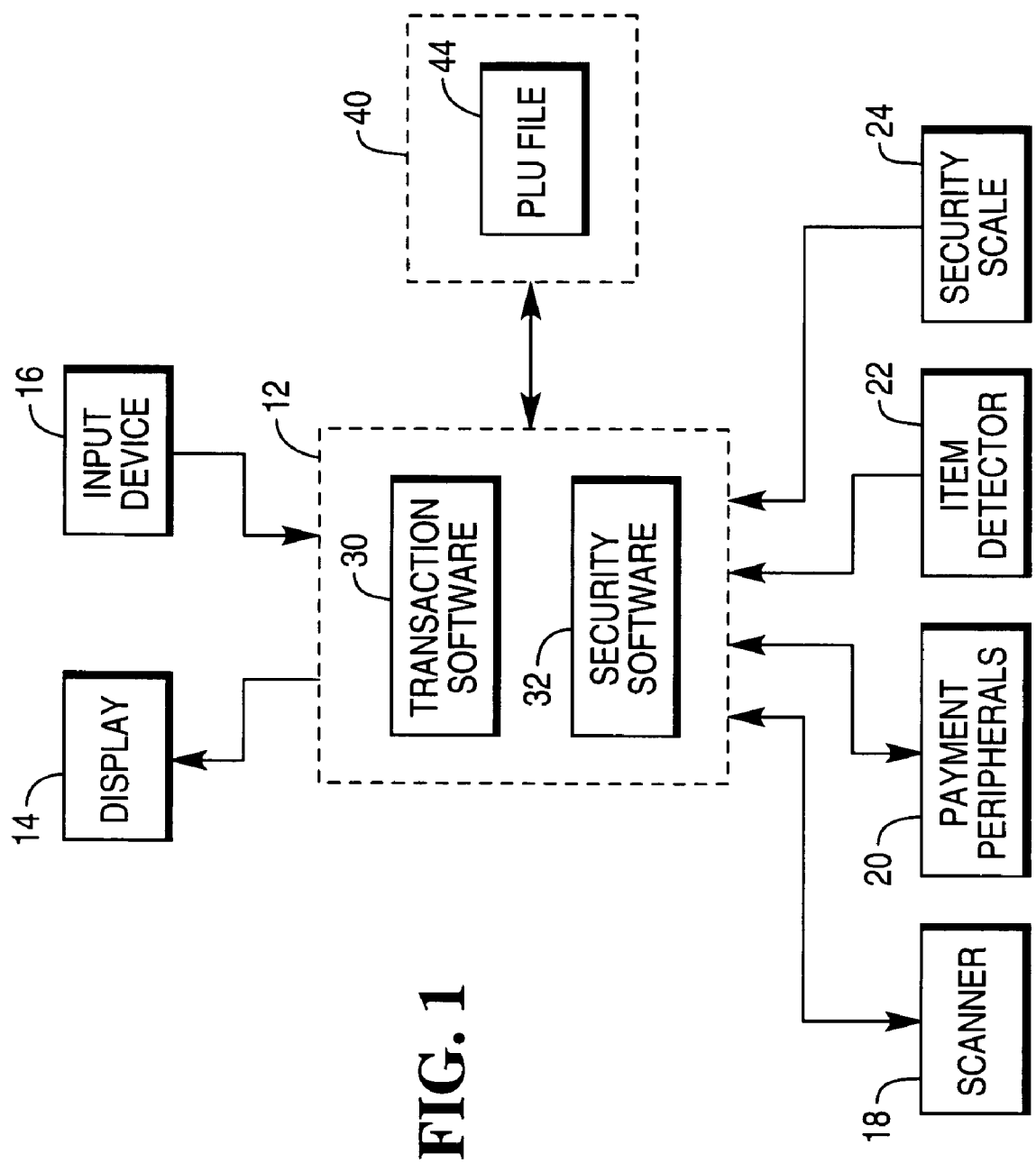
FIG. 1 is a block diagram of a self-service checkout system.

Referring to FIG. 1, self-service checkout system 10 primarily includes computer 12, display 14, input device 16, scanner 18, payment peripherals 20, item detector 22, and security scale 24.

Computer 12 executes transaction software 30, which records items for purchase and processes payment. Transaction software 30 obtains item information from scanner 18 and queries transaction server 40 for price information.

Computer 12 also executes security software 32, which compares weights of scanned items to incremental weight increases on security scale 24. If the item fails the test, security software 32 alerts the operator and initiates procedures to correct the error or alert security personnel.

Display 14 may include a liquid crystal display.

Input device 16 may include a keyboard.

Display 14 and input device 16 may alternatively be combined as a touch screen.

Scanner 18 reads bar code labels on purchased items. Scanner 10 may also include an integral scale for weighing produce items.

Payment peripherals 20 may include various peripherals for completing payment, including a card reader, bill and coin acceptors, bill and coin dispensers, signature capture device, and receipt printer.

Item detector 22 detects items placed onto security scale 24. Item detector 22 may include a motion detector, or a camera, such as a charge coupled device camera. Use of a camera could provide additional security information, such as size, shape, and color information.

Security scale 24 weighs items to be purchased. During a typical transaction, security scale 24 weighs items following scanning.

Transaction server 40 stores price look-up file 44, which may include reference weight information.

Figure 2:
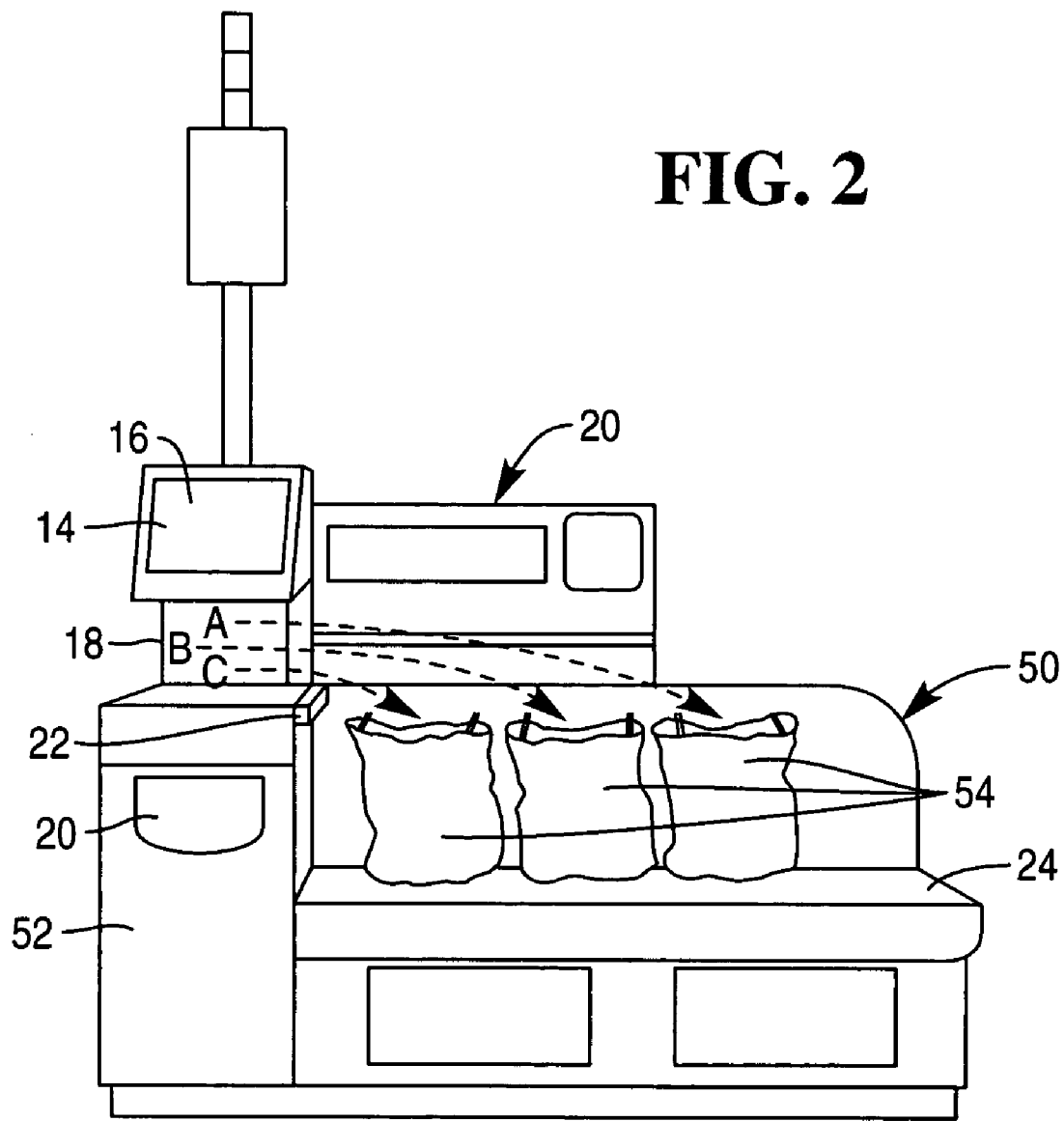
FIG. 2 is a an example of a self-service checkout system configured with the item detection system of the present invention.

With reference to FIG. 2, an example self-service checkout system 10, configured with item detector 22, is illustrated.

Security scale 24 is located within bag well 50.

Scanner 18 is located within pedestal 52.

Display 14 and input device 16 are mounted above scanner 18 as a touch screen.

Payment peripherals 20 are mounted above bag well 50.

Item detector 22 is mounted on the bag well side of pedestal 52. From this location, item detector 22 can detect movement of items passing between scanner 18 and bag well 50, on any of paths A, B, or C, with minimal or no obstruction of hand movements from scanner 18 to any of bags 54.

If item detector 22 is a camera, item detector 22 may detect additional information, such as item size, shape, and color information. If oriented towards bag well 50, item detector 22 may also detect placement of items into bags 54.

Figure 3:
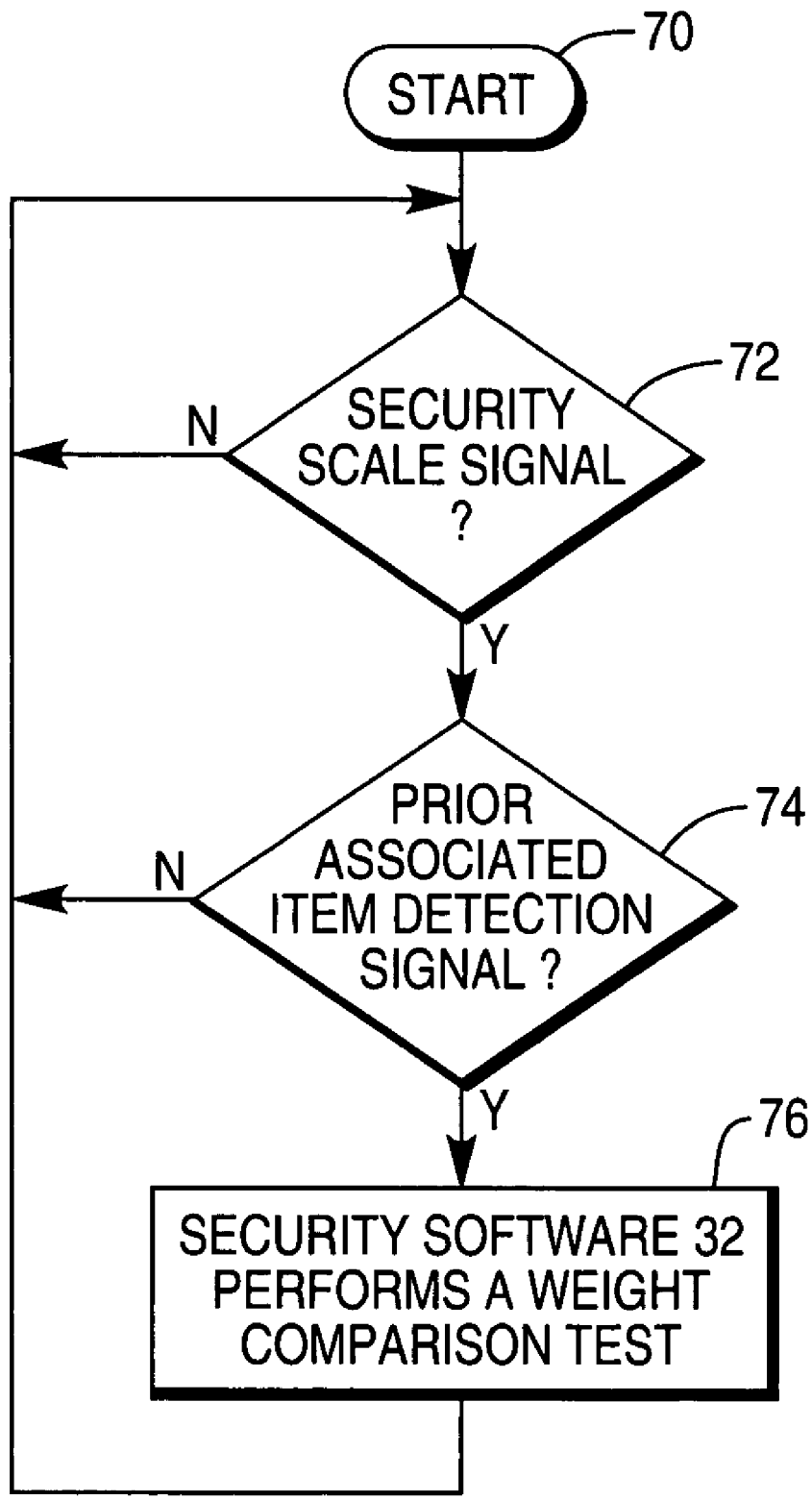
FIG. 3 is a flow diagram illustrating a security method.

With reference to FIG. 3, operation of security software 32 is illustrated, beginning with Start 70.

In step 72, security software 32 waits for an incremental weight signal from security scale 24. If security software 32 receives an incremental weight signal, operation proceeds to step 74.

In step 74, security software 32 determines whether item detector produced an item detection signal within a predetermined time period prior to receiving the incremental weight signal. The time period is typically about a second. If not, security software 32 ignores the weight signal and operation returns to step 72 to wait for another signal from security scale 24. Otherwise, operation proceeds to step 76.

In step 76, security software 32 performs a weight comparison test involving a comparison of the incremental weight information in the incremental weight signal to reference weight information in PLU file 44. If the item fails the test, security software 32 alerts the operator and initiates procedures to correct the error or alert security personnel. After the item passes the test, operation returns to step 72 to wait for another signal from security scale 24.

Although the present invention has been described with particular reference to certain preferred embodiments thereof, variations and modifications of the present invention can be effected within the spirit and scope of the following claims.

What is claimed is:

1. A method of verifying item placement on a security scale comprising the steps of:
   receiving an incremental weight signal from the security scale;
   determining whether an item detection signal was received from an item detector within a predetermined time period prior to receipt of the incremental weight signal;
   performing a weight comparison test involving a comparison of incremental weight information in the incremental weight signal to reference weight information if the item detection signal was received; and
   ignoring the incremental weight signal if the item detection signal was not received within the predetermined time period prior to receipt of the incremental weight signal.

2. A method of verifying placement of an item on a security scale of a retail terminal comprising the steps of:
   scanning an item by a bar code scanner coupled to the terminal;
   sensing placement of the item in a bag well following scanning by an item detector coupled to the retail terminal, wherein the item detector produces an item detection signal;
   recording an incremental weight of the item by a security weight scale in the bag well, wherein the security weight scale produces an incremental weight signal;
   performing a weight comparison test involving a comparison of the incremental weight to an expected weight;
   actuating a security warning if the incremental weight fails to equal the expected weight; and
   processing purchase of the item by the terminal if production of the item detection signal precedes production of the incremental weight signal within a predetermined time period.

3. A self service checkout system comprising:
   a computer;
   a bar code scanner in communication with said computer for reading a bar code label on an item;
   a security weight scale in communication with said computer for weighing the item and for generating an incremental weight signal, wherein said security weight scale is located in a bag well adjacent the bar code scanner; and
   an item detector for detecting movement of the item following scanning by the bar code scanner and for generating an item detection signal;
   wherein the computer ignores the incremental weight signal unless the computer receives the item detection signal within a predetermined time period preceding receipt of the incremental weight signal.

4. The system of claim 3, wherein the computer performs a weight comparison test involving a comparison of an incremental weight from the security weight scale to an expected weight and actuates a security warning if the incremental weight fails to equal the expected weight.

5. A self-service checkout system comprising:
   a computer;
   a bar code scanner in communication with said computer for reading a bar code label on an item;
   a security weight scale in communication with said computer for weighing the item and for generating an incremental weight signal, wherein said security weight scale is located in a bag well adjacent the bar code scanner; and
   an item detector for detecting movement of the item following scanning by the bar code scanner and for generating an item detection signal;
   wherein the computer ignores the incremental weight signal unless the computer receives the item detection signal within a predetermined time period preceding receipt of the incremental weight signal; and
   wherein the computer performs a weight comparison test involving a comparison of an incremental weight from the security weight scale to an expected weight and actuates a security warning if the incremental weight fails to equal the expected weight and the computer has received a prior item detection signal from the detector.

6. The system of claim 5, wherein the item detector is mounted to a side of the bag well.

7. The system of claim 5, wherein the item detector comprises a motion sensor.

8. The system of claim 5, wherein the item detector comprises a camera.

9. The system of claim 5, wherein the item detector senses size of the item.

10. The system of claim 5, wherein the item detector senses shape of the item.

11. The system of claim 5, wherein the item detector senses color of the item.

* * * * *